US008651265B2

(12) United States Patent
Vazeille et al.

(10) Patent No.: US 8,651,265 B2
(45) Date of Patent: Feb. 18, 2014

(54) VIAL CONVEYOR

(76) Inventors: Joël Vazeille, Paris (FR); Patrick Chaigne, Saint-Maur des Fosses (FR)

( * ) Notice: Subject to any disclaimer, the term of this patent is extended or adjusted under 35 U.S.C. 154(b) by 181 days.

(21) Appl. No.: 13/141,163

(22) PCT Filed: Dec. 9, 2009

(86) PCT No.: PCT/FR2009/052456
§ 371 (c)(1),
(2), (4) Date: Aug. 23, 2011

(87) PCT Pub. No.: WO2010/072938
PCT Pub. Date: Jul. 1, 2010

(65) Prior Publication Data
US 2011/0297508 A1 Dec. 8, 2011

(30) Foreign Application Priority Data

Dec. 22, 2008 (FR) ...................................... 0858943

(51) Int. Cl.
*B65G 47/86* (2006.01)
(52) U.S. Cl.
USPC ................ 198/470.1; 198/468.2; 198/867.02; 198/803.7
(58) Field of Classification Search
USPC .......... 198/465.4, 470.1, 473.1, 468.2, 803.3, 198/803.7, 867.02, 867.05, 867.06; 422/63
See application file for complete search history.

(56) References Cited

U.S. PATENT DOCUMENTS

| 3,206,006 | A | * | 9/1965 | Meeder et al. ................ 198/728 |
| 3,552,536 | A | * | 1/1971 | Emary .......................... 198/733 |
| 3,878,387 | A | * | 4/1975 | Kovacic ........................ 362/473 |
| 4,807,421 | A | * | 2/1989 | Araki et al. .................... 53/167 |
| 5,024,318 | A | | 6/1991 | Schwarze et al. |

FOREIGN PATENT DOCUMENTS

DE        202 09 307        8/2002

OTHER PUBLICATIONS

International Search Report dated Feb. 16, 2010, corresponding to the PCT Application.

* cited by examiner

*Primary Examiner* — Leslie A Nicholson, III
(74) *Attorney, Agent, or Firm* — Young & Thompson

(57) ABSTRACT

A conveyor includes a plate with a closed-loop track along which vials are driven in a continuous manner in holders arranged so as to be in free contact with each other in order to form a continuous stream along the track. Each holder includes a horizontal platen (72) to which is connected a plurality of vertical blades (72) forming a ring and capable of elastically moving away from the rotational axis of the platen, the inner surfaces thereof being intended for bearing against the periphery of a vial.

17 Claims, 6 Drawing Sheets

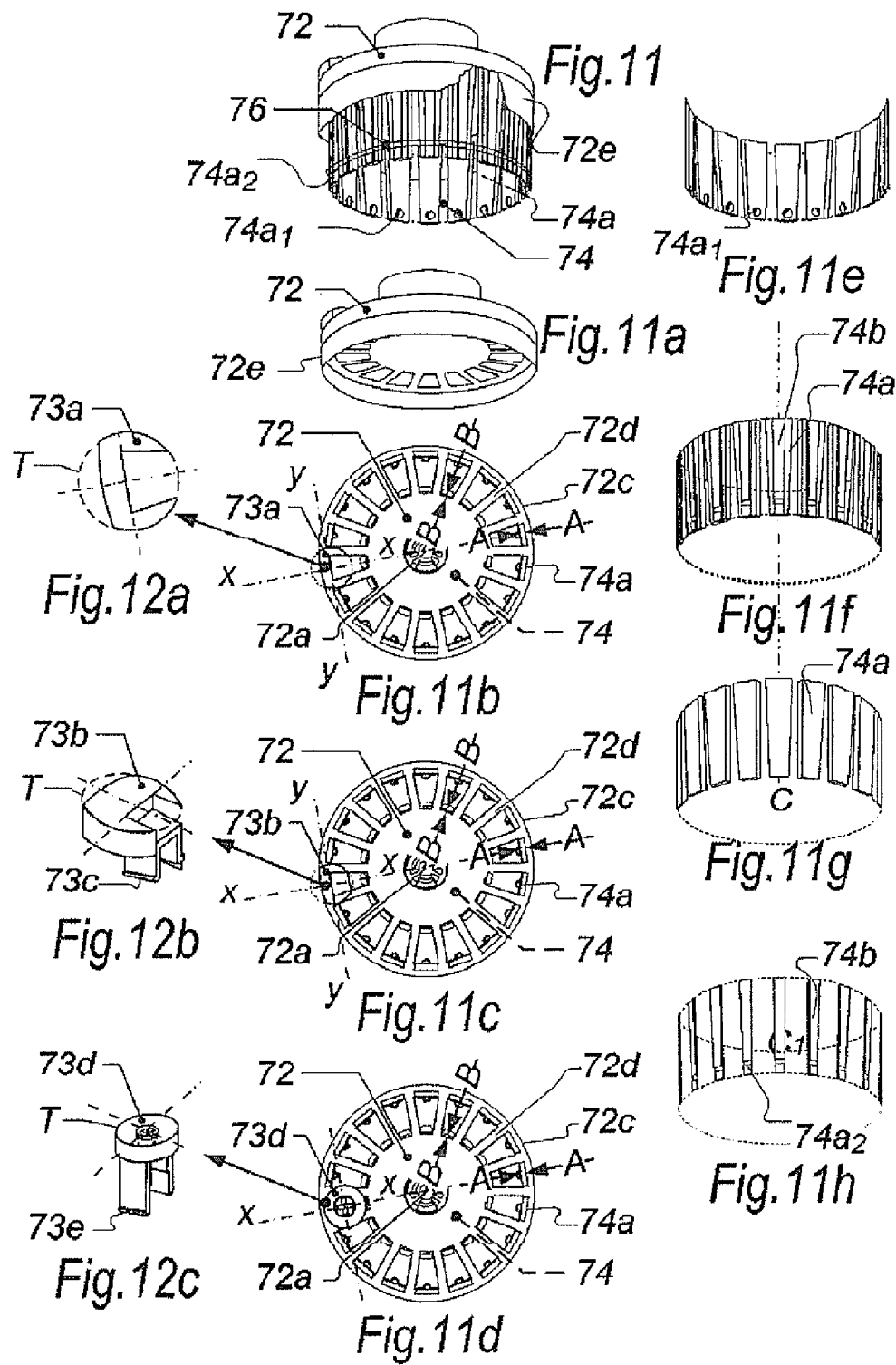

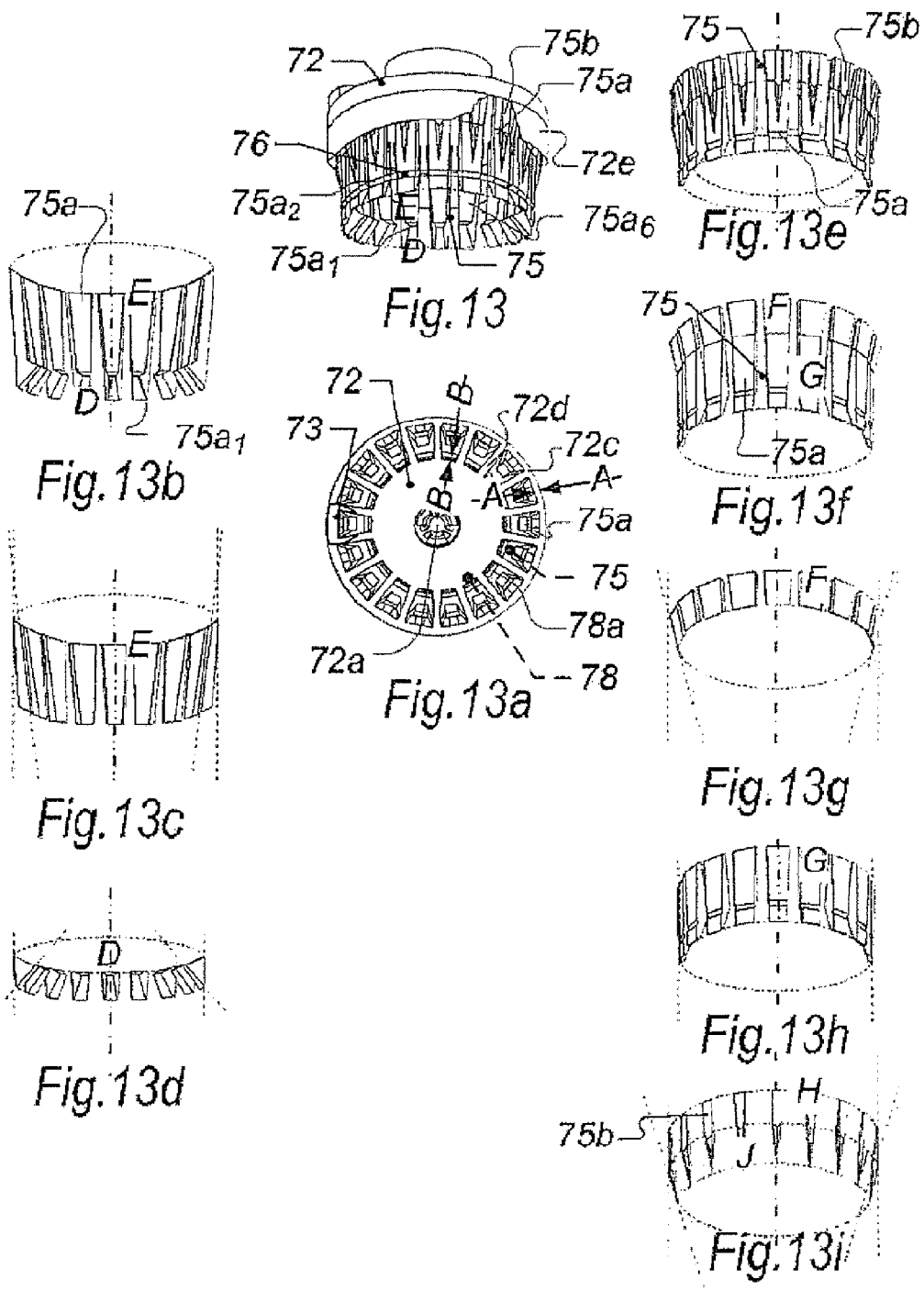

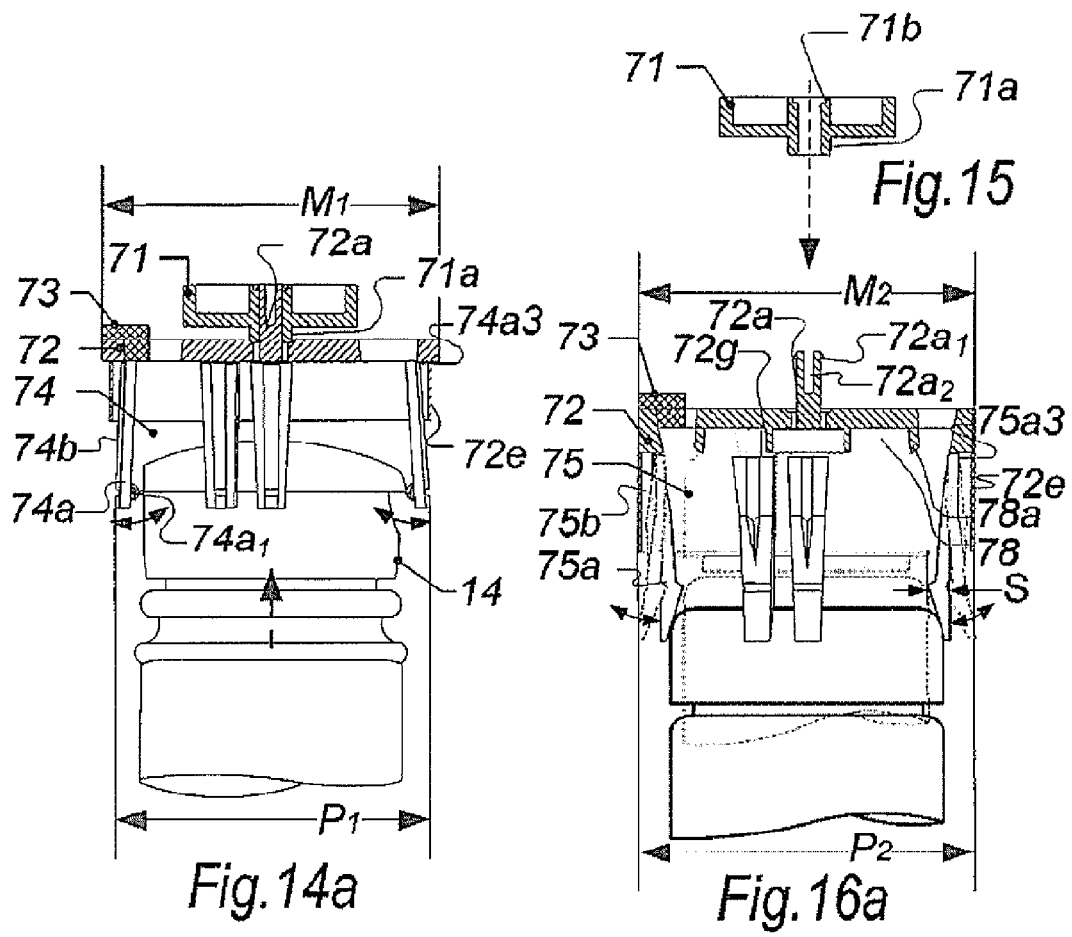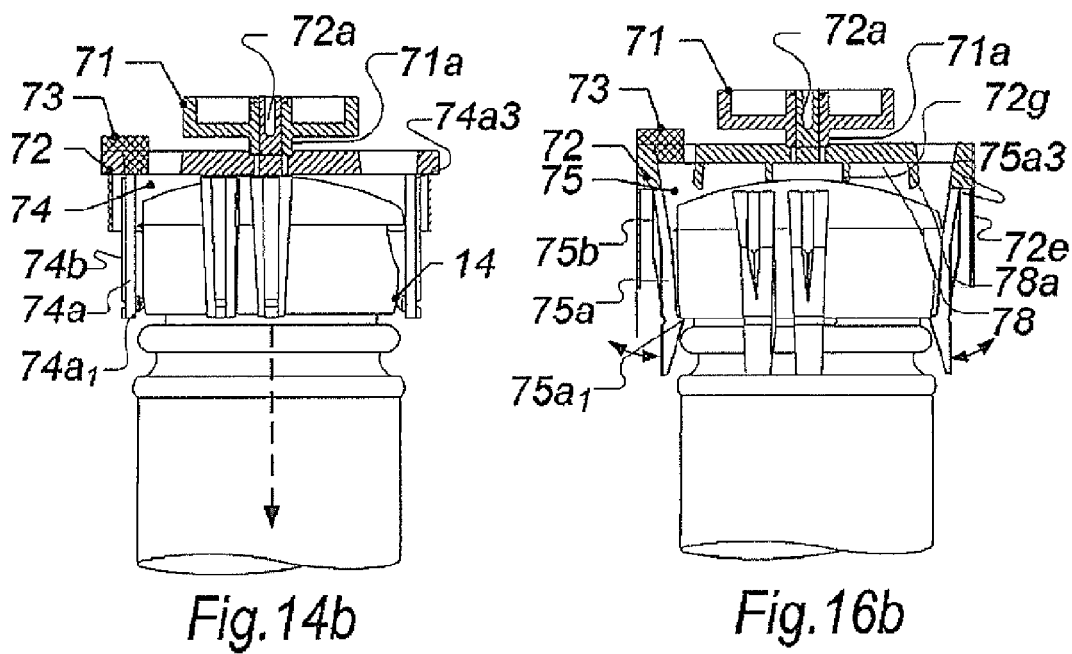

VIAL CONVEYOR

BACKGROUND OF THE INVENTION

The present invention relates to closed-loop conveyors intended to receive containers such as vials, test tubes, tubes, pots, bottles, capsules etc made from glass or any other material. Following convention, these containers will be referred to as vials in the following description, it being understood that the term vial designates the main body of the receptacle as well as the means for closing it (stopper or other means). The function of these conveyors is to store as many vials as possible in as small a space as possible and to present them systematically directed towards the user at the end of their travel along a pre-established and controlled route. On the one hand, this ensures that the label is systematically visible so that the contents of said vials can be easily identified and, on the other hand, makes it possible to access each of the vials directly without the need to first remove those situated at the front.

Said conveyors can be made from plastic or any other material which can be molded, by injection or any other method, or shaped by machining.

Said conveyors can be used in both a domestic and a professional environment, for various applications such as, for example, storing spices, herbs, condiments, sauces, sewing materials, screws, bolts and nuts, stationery materials, etc.

In a domestic context, said conveyors, suspended or resting on a surface, can be integrated easily and harmoniously into kitchen furniture or shelving or other storage units.

DESCRIPTION OF THE PRIOR ART

A conveyor of this type, intended for storing grocery products, is described in the U.S. Pat. No. 5,024,318, which expired on Mar. 18, 2003. It consists essentially of a vial conveyor comprising a body equipped with female posts intended to receive the male fastening posts of a conveying tray which itself comprises a peripheral tray supporting the drive mechanism, and a central tray, the two trays being held equidistant and in a same plane by said posts. The slot formed by the gap between the two trays forms a loop track along which circulate vial supports comprising a drive roller, a plate which is itself equipped with a guide piece and with an orienting stud in its upper part and with a sleeve in its lower part. The function of said orienting stud is to maintain the orientation of the support, and consequently that of each vial and its label, constant relative to the track. The supports are all in contact with one another, such that the displacement of a single support causes the simultaneous displacement of all the other supports along the track in the manner of a noria. A reversible electric motor actuates a set of gearwheels driving a wheel with semi-circular notches, the rotation of which causes the displacement of the supports.

However, this conveyor has the disadvantage of being designed so that it can only receive perfectly cylindrical vials which are all identical, with the result that it is impossible to use it directly with the numerous vials of highly varying shapes which are adopted in particular by the herb and condiment dispensers which are found on the market. The user thus has to decant the products from the vials in which they were bought into the specially provided vials supplied with the dispenser. Moreover, the supports for the vials are not designed to support the weight of the glass vials which are generally adopted by spice dispensers.

The object of the invention is to overcome these disadvantages and to provide a vial conveyor which can accommodate a wide variety of commercially available vials including their stoppers or grinders, having different external configurations and weights, without the need for decanting their contents into vials which are specific to the conveyor.

SUMMARY OF THE INVENTION

According to the invention, the conveyor, of the type consisting of a tray equipped with a closed-loop track along which vials are driven continuously in supports arranged freely in contact with one another so as to form a continuous stream along the track, each support consisting of a horizontal plate to which are connected a plurality of vertical blades, forming a ring, which are capable of moving away elastically relative to the axis of rotation of the plate, their inner faces being intended to retain the vial by gripping the periphery of the vial after it has been inserted into said ring, wherein the inner and outer faces of the internal and external blades of the vial supports are flat at their join with the plate.

The invention is also distinguished by the following features:
the thickness of the upper parts of the internal and external blades of the vial supports is reduced at the join of said blades to the plate,
the outer face of the external blades of the vial supports has a stiffener,
the outer faces of the external blades of the vial supports form at their upper part an inverted open truncated right cone, and at their lower part a cylindrical shape or an inverted open truncated right cone,
the stiffeners of the external blades of the vial supports form at their upper part a cylindrical figure, and at their lower part an inverted open truncated right cone,
the plate of the vial supports comprises an external rim connected by spokes to a hub comprising a rotational spindle,
according to an advantageous feature of the invention, the plate of the vial supports has a stop ring which surrounds the external vertical blades of the sleeve and limits the elastic movement of the blades towards the outside. The regular gap between the ring and said blades makes the form of the ring conditional on that of the blades and delimits the movement of the latter,
the underside of the plate of the vial supports also has a cavity delimited by an internal retaining ring,
the internal retaining ring of the vial supports consists of independent blades located vertically between two spokes and tangential to the external edge of the hub of the plate,
the blades of the internal retaining ring of the vial supports are oblique and divergent and have in their lower part an outward-facing bevel which advantageously makes it possible to house spice grinders provided with a bowl which in some cases replace the stoppers,
the underside of the plate of the vial supports is equipped with a depth stop ring for limiting how far the vials can be pushed in,
the plate of the vial supports can be equipped with an orienting stud which interacts with the track so as to maintain constant the relative position of the vial which it carries during its displacement along said track,
the orienting stud of the vial supports has a crescent-shaped contour formed from a traced circular figure,
the orienting stud of the vial supports is manufactured as a separate piece which can be detached from the plate using its carrier, equipped with lugs,
the orienting stud of the vial supports consists of a wheel rotating freely about a spindle, the piece for guiding the vial supports along the track is formed by a hollow guide spindle incorporated into the drive roller, and said hollow spindle receives the rotational spindle connecting the plate to the drive roller, the conveyor for the vial supports has a telescopic battery box.

DESCRIPTION OF THE DRAWINGS

Other features and advantages of the invention will become apparent from the following description of a non-limiting preferred exemplary embodiment, made with reference to the attached diagrammatic drawings, in which:

FIG. 11 is a perspective view of the underside of a vial support according to FIG. 2.

FIGS. 11a to 11h are exploded views of the different constituent elements of the vial support according to FIG. 2, respectively:

FIG. 11a is a perspective view of the underside of the plate of said support with its skirt forming a stop.

FIG. 11b is a plan view from above of the plate of said support with its orienting stud incorporated into the plate.

FIG. 11c is a view similar to FIG. 11b, showing a detachable orienting stud.

FIG. 11d is a view similar to FIG. 11c, showing another embodiment of the rotary detachable orienting stud.

FIG. 11e is a perspective view of the inside, showing the inner face of the external blades of the support according to FIG. 2.

FIG. 11f is a perspective view of the exterior, showing the outer face of the external blades of the support according to FIG. 2 with their stiffener.

FIG. 11g is a perspective view of the exterior, showing the outer face of the external blades of the support according to FIG. 2 without their stiffener.

FIG. 11h is a perspective view of the exterior of the stiffeners of the external blades shown in FIG. 11f.

FIG. 12a is an enlarged plan view from above of the orienting stud of the vial support in FIG. 11b.

FIG. 12b is a perspective view of the detachable orienting stud of the vial support in FIG. 11c.

FIG. 12c is a perspective view of the rotary detachable orienting stud of the vial support in FIG. 11d.

FIG. 13 is a perspective view of the underside of a vial support according to FIG. 3.

FIGS. 13a to 13i are exploded views of the different constituent elements of the vial support according to FIG. 3, respectively:

FIG. 13a is a plan view from above of the plate of said support with its orienting stud incorporated into the plate.

FIG. 13b is a perspective view of the inside, showing the inner face of the external blades of the support according to FIG. 3.

FIG. 13c is a perspective view of the exterior, showing the outer face of the external blades of the support according to FIG. 3 with their stiffeners.

FIG. 13d is a perspective view of the exterior of said multipurpose sleeve, showing the outer face of the external blades in FIG. 13c without their stiffeners.

FIG. 13e is a perspective view of the outer upper part of the external blades in FIG. 13d.

FIG. 13f is a perspective view of the outer lower part of the external blades in FIG. 13d.

FIG. 13g is a perspective view of the exterior of the stiffeners of the external blades in FIG. 13c.

FIG. 14a illustrates the beginning of the insertion of a vial into the vial support in FIG. 2.

FIG. 14b illustrates the retention of a vial inserted into a support according to FIG. 14a.

FIG. 15 is a view in vertical section of the drive roller.

FIG. 16a is a view in vertical section of the support according to FIG. 3, illustrating the beginning of the insertion of a vial, the drive roller having been withdrawn from the plunger spindle of the plate.

FIG. 16b illustrates the retention of a vial inserted into a support according to FIG. 16a.

DESCRIPTION OF THE PREFERRED EMBODIMENTS

Figure 1:
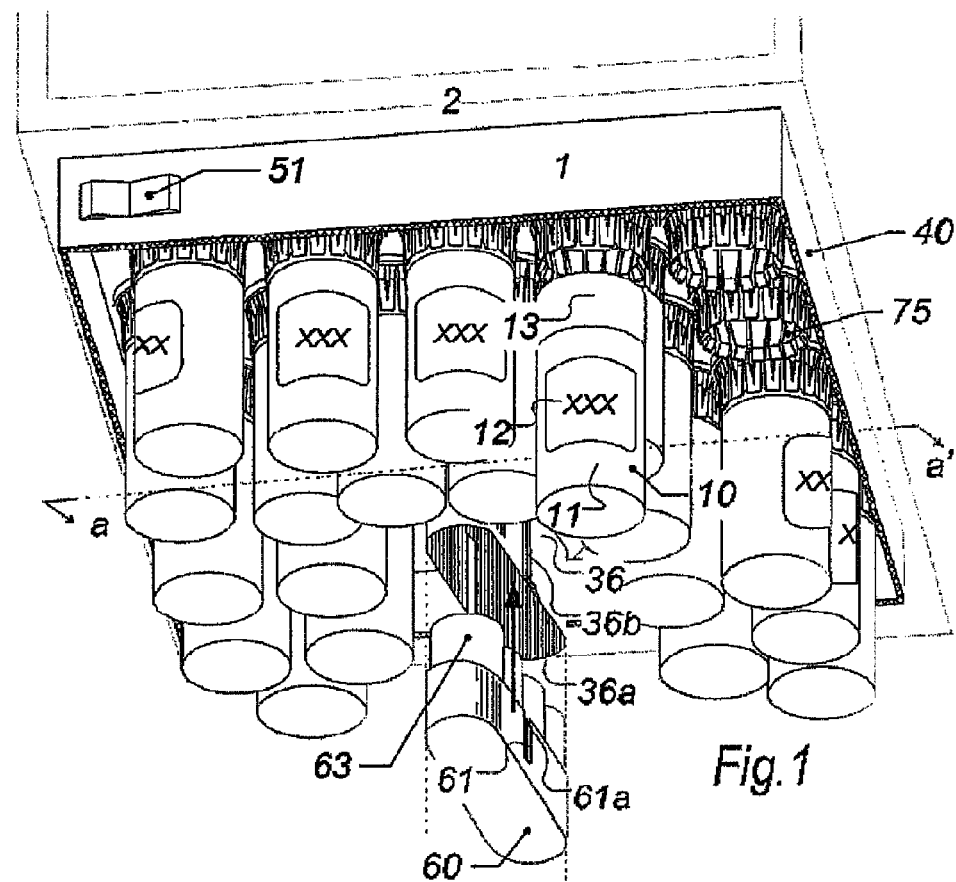
FIG. 1 is an overall perspective view of the underside of an apparatus according to the invention, fixed beneath a shelf, in its alternative embodiment with suspended vials.

As shown in FIG. 1, the apparatus 1 is designed so as to receive and retain a plurality of vials 10 arranged side by side so as to allow as many vials as possible to be stored in as small a space as possible and to displace them along a loop track so as to bring them to the front where the user can directly access each of them, without having to manipulate the ones which he does not need.

Figure 4:
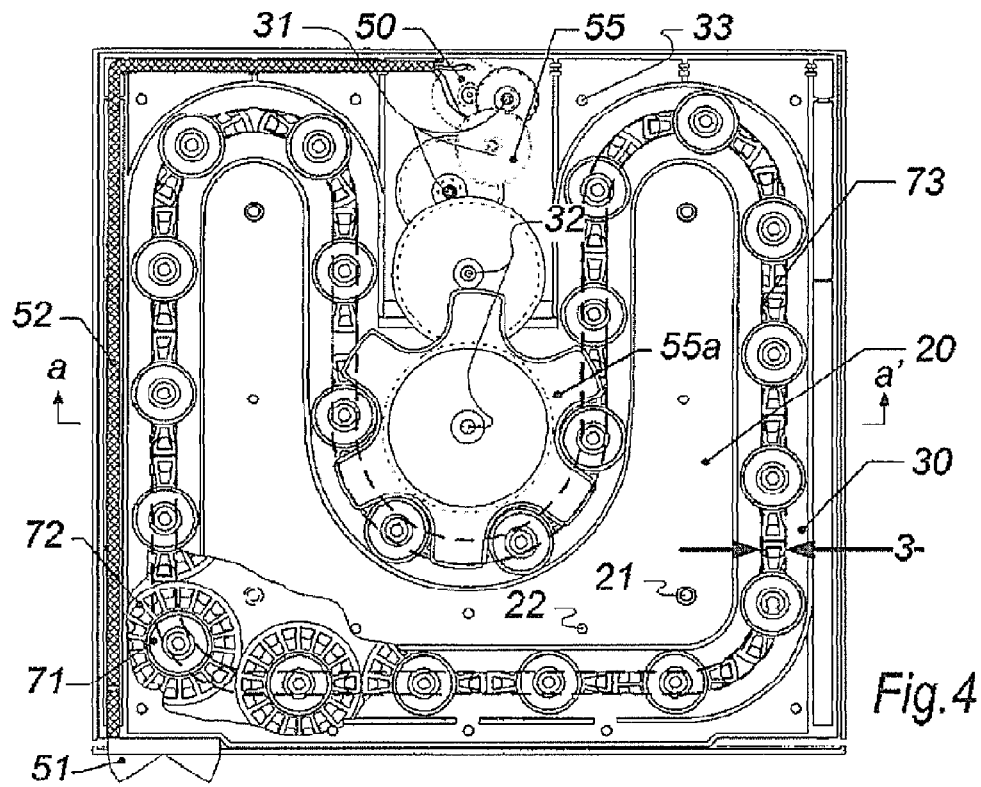
FIG. 4 is a plan view from above with partial cutaway of the central tray and the peripheral tray forming the conveying track for the vials, and of the drive mechanism.
Figure 5:
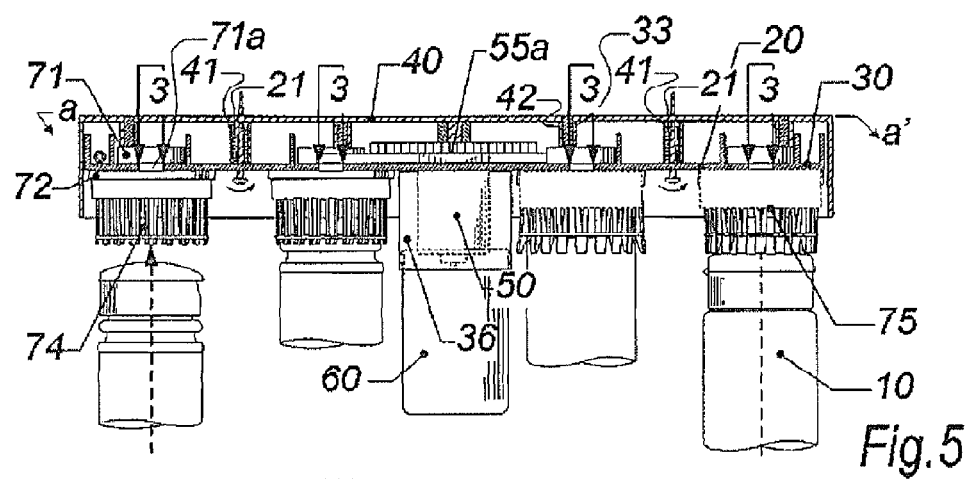
FIG. 5 is a view in vertical section of an apparatus according to the invention, along the line a-a' in FIG. 4, showing the engagement of different vials in supports according to FIGS. 2 and 3.
Figure 6:
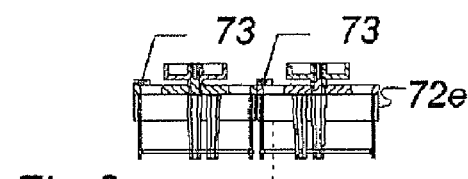
FIG. 6 is a view in vertical section of two contiguous vial supports according to FIG. 2.
Figure 7:
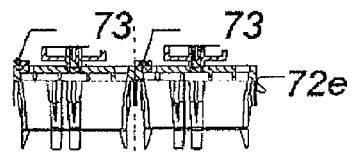
FIG. 7 is a view in vertical section of two contiguous vial supports according to FIG. 3.
Figure 8:
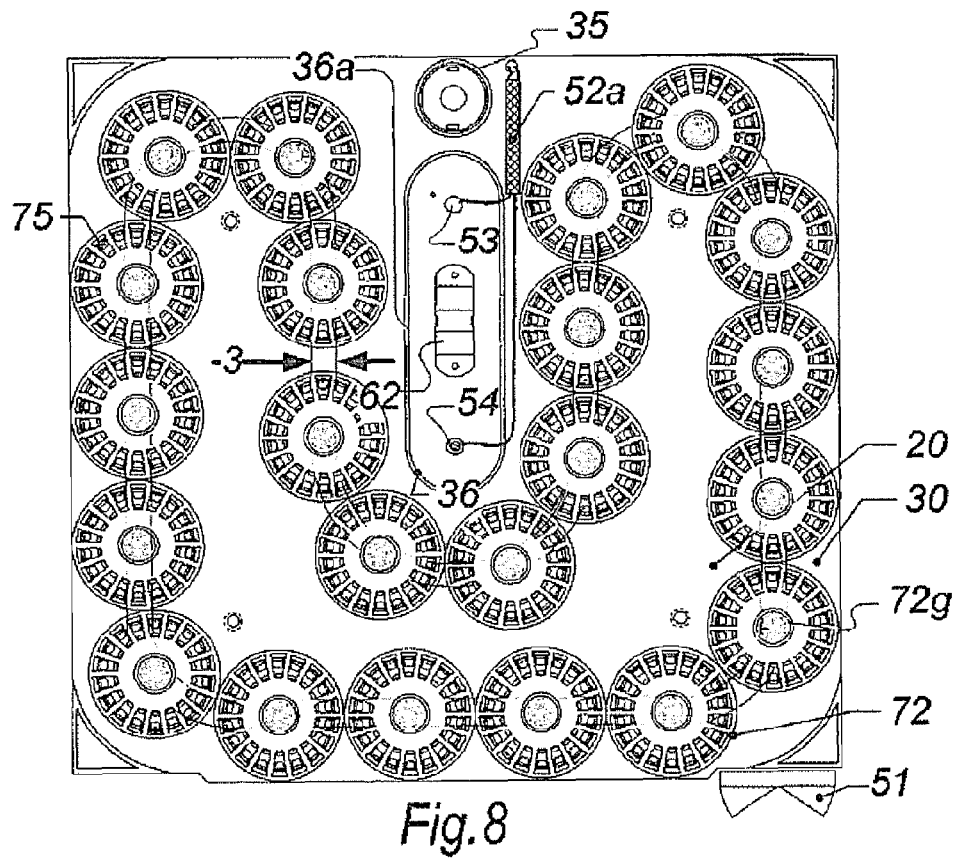
FIG. 8 is a plan view from beneath of the apparatus, showing diagrammatically the vial supports and their conveying, as well as the location of the shaft for housing the electric motor and the battery box.
Figures 9, 10:
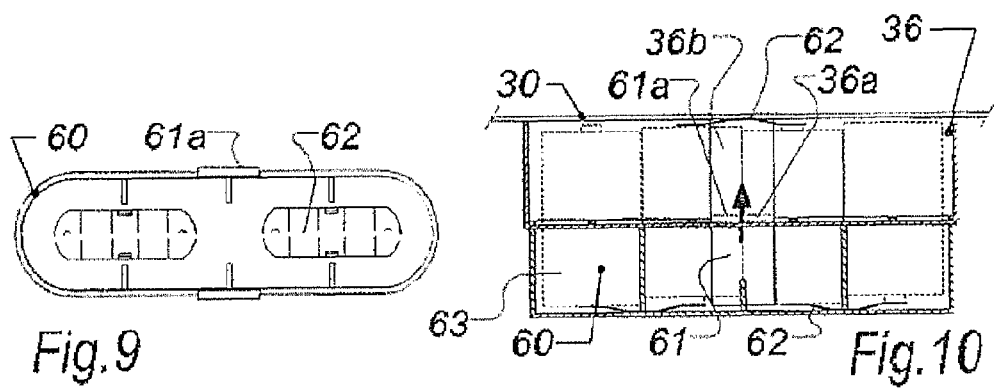
FIG. 9 is a view from above of the telescopic battery box.
FIG. 10 is a view in vertical section of the battery box in FIG. 9 and of its housing shaft.

The apparatus 1 shown in this exemplary embodiment is of the type in which the vials are suspended. It may be fixed beneath a piece of furniture or beneath a shelf 2 using any appropriate means. In the example shown, the apparatus 1 is fixed beneath the shelf 2 by four screws which pass through the hollow posts 21 (see FIGS. 4 and 5) and the top 40. The top 40 supports a central tray 20 surrounded by a peripheral tray 30. The gap between the two trays forms a closed-circuit track 3 which describes the shape of two Us, one inside the other and joined together by two hairpin bends (FIG. 4). The top 40 is equipped, on the one hand, with circular orifices into which are fitted the solid integral spindles 31 of the peripheral tray 30, for three of the gearwheels of a gear set and, on the other hand, with male posts which are inserted into the hollow spindles 32 of the two other gearwheels so as to ensure the parallelism of the whole drive mechanism. Lastly, the top 40 is equipped with female posts 41, 42 intended to receive the male posts 21, 22 of a central tray 20, and male posts 33 of a peripheral tray 30 which fit into said top 40. Said posts make it possible to join together the two trays and the top and to hold them locked together. Said peripheral tray 30 surrounds said central tray 20, thus forming a closed-circuit track 3 approximately 10 mm wide, the front part of which is in the shape of a U, the two legs of which are extended at the rear by two inverted Us, the two inner legs of which are themselves joined by a U, the dimension of which is determined by the diameter of the drive roller which is itself determined by the diameter of the vials. The vial supports which circulate along said track form a continuous stream. They each comprise, on the one hand, a drive roller 71 which slides on the path formed by the edges of said track and which retains and drives a plate 72 and its associated sleeve 74 or 75 which itself retains a vial 10 as shown in FIG. 4 and FIG. 5 and, on the other hand, an orienting stud 73 which interacts with the track 3 so as to maintain constant the orientation of said vial throughout its displacement along the track 3.

As shown in FIG. 1, each vial 10 consists of a body 11 to which an information label or a branding label 12 is applied. The body 11 is closed by a stopper 13 which serves as a base allowing it to be suspended, retained in the sleeve 74 or 75 of a movable vial support as shown in FIGS. 1 to 5. Because the orientation of the vials relative to the track is maintained constant by the orienting studs 73, the label 12 of each vial, as long as it has been correctly placed when the vials were inserted into the supports, remains in a position where it can be read directly by the user when the vials pass along the track portion situated at the front of the apparatus.

In the present exemplary embodiment of the invention, there are twenty-two vial supports and the external diameter of their plate 72 is 53 mm. They form a continuous stream along the whole track 3 where each plate is in contact with the plate which it pushes and the plate which pushes it. The displacement of one support therefore causes the displacement of all the other supports along said track.

A switching/reversing device 51, fixed to the front of the apparatus, is connected by a suitable cable 52 to a small reversible 6V DC electric motor 50, force-fitted into a shaft 35 fixed beneath the outer tray. The motor is supplied by a set of four round 1.5V batteries 63 which may or may not be rechargeable. Said motor has a nominal rotational speed of approximately 6000 r/min. It actuates, via a set of gearwheels 55, at the speed of 20 r/min, a notched wheel 55a, the recesses of which are adapted to the diameter of the drive rollers 71 of the vial supports. This wheel 55a, arranged substantially at the center of the device formed by the track 3, drives the vial supports with which the drive rollers 71 are directly in contact, which has the effect of driving all the supports in front of them just by pushing them.

Figures 2, 3:
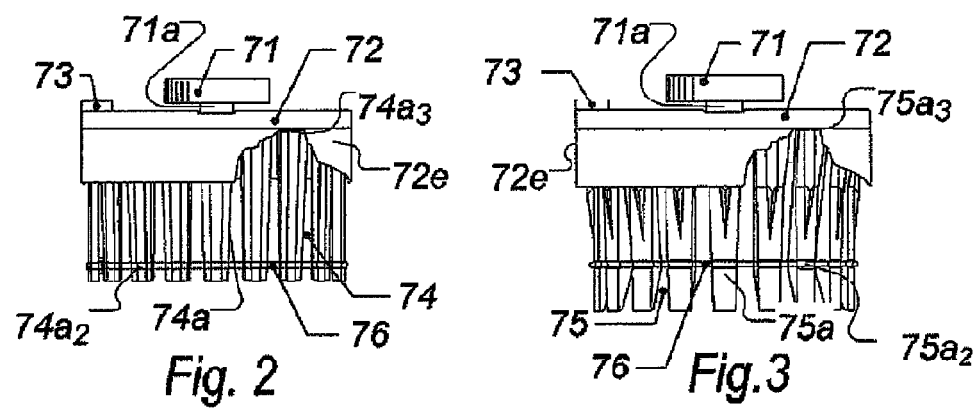
FIG. 2 is a view in elevation with partial cutaway of a first simplified embodiment of a vial support equipped with vertically located external blades.
FIG. 3 is a view in elevation with partial cutaway of a second simplified embodiment of a vial support equipped with vertically located external blades.

In FIGS. 2 and 3, it can be seen that each vial support travelling along the track 3 comprises a drive roller 71, a plate 72 and an associated sleeve 74 or 75, an orienting stud 73 and a skirt 72e.

Two exemplary embodiments of the vial supports according to the invention will now be described in detail with reference to FIGS. 11 to 13g. As can be seen in FIGS. 11 and 13, these two embodiments share the fact that each support consists of a horizontal cylindrical plate 72 at the periphery of which is connected a plurality of radial vertical blades 74a, 75a, termed external blades, which can move away elastically relative to the axis of rotation of the plate, each radial blade being equipped on its inner face with retaining means 74a1, 75a1 intended to come to bear against the periphery of a vial. Moreover, a peripheral skirt 72e forms a stop limiting the elastic outward movement of the external blades. Lastly, the lower part of the outer face of the external blades has a groove 74a2 or 75a4 which can accommodate an O-ring or any other elastic hoop means 76 intended to reinforce the bearing contact of the external blades against the periphery of the vials. It is understood that, because the sleeve of the vial supports is formed by external blades capable of being deformed individually, it is therefore adapted to vials with widely varying shapes and sizes.

In the first exemplary embodiment shown in FIGS. 11b to 11h, it can be seen that the plate 72 of the vial supports assumes the shape of a wheel comprising an external rim 72c connected by spokes 72d to a hub which has a plunger spindle 72a. These spokes 72d are delimited by trapezoidal holes made in the plate 72. On the one hand, this design permits a significant reduction in the quantity of material used and, on the other hand, when the supports are manufactured by the injection molding of plastic, enables the use of the corresponding dies for the mold to form the blades at the same time.

The vial support shown in FIGS. 11 to 11h is more particularly designed for vials of the type having an irregularly shaped cap with at least one depression over its height (reference numeral 14 in FIGS. 14a and 14b). In this example, the external blades 74a are vertically located straight parts and are equipped on their inner face with a vial retaining lug $74a_1$. In the standby position, said external blades 74a form a cylinder (reference symbol C in FIG. 11g), subject to the draft required for removal from the mold.

The external blades 74a preferably have, on their outer face, stiffeners 74b which are inscribed within a cylindrical figure (reference symbol C1 in FIG. 11h), subject to the draft required for removal from the mold.

FIGS. 14a and 14b illustrate the behavior of the straight external blades 74a which, being free at their lower part, move elastically outwards when a vial is inserted by being pushed upwards, pivoting about an axis situated in the connection zone of each blade 74a to the plate 72 so as subsequently to retain it when the lugs $74a_1$ naturally, by virtue of the spring effect thereof, lodge themselves in the first depression 14 encountered on the contour of the vial. The external diameter of the lower part of the sleeve (reference symbol P1 in FIG. 14a), at the end of the phase in which it moves away, must not be greater than the external diameter (reference symbol M1 in FIG. 14a) of the plates, the principle of the displacement of the vial supports entailing that the plates remain in contact. As indicated above, the skirt 72e forms a stop preventing the external blades 74a from moving away beyond this diameter, which ensures that the deformation of the external blades will not exceed the elastic limit of the material from which they are manufactured.

In FIG. 11b to 11d, it can be seen that the inner and outer faces of the external blades 74a are flat at their join (reference symbol A) with the plate 72, in other words they do not match the radius of curvature of the periphery of the plate, and thus the fracture or non-return of said blades is prevented, which would occur if the form of their upper parts were other than straight, for example curved.

It can also be seen in FIG. 2 that the thickness of the upper parts $74a_3$ of the external blades is reduced by the break in the stiffeners 74b before the join with the plate 72 so as to form a zone of less resistance, siting the flexibility of said external blades at this point.

According to the second preferred embodiment shown in FIGS. 13 to 13g, 16a and 16b, the vial supports are specially adapted to accommodate vials found on the market which have a cap with no throat which can be accessed by the ends of the vertical external blades. As in the previous exemplary embodiment, the vial supports are in the form of a wheel comprising an external rim 72c connected by spokes 72d to a hub comprising a plunger spindle 72a. These spokes 72d are delimited by trapezoidal holes made in the plate 72. A peripheral skirt 72e forms a stop limiting the elastic outward movement of the external blades.

At this rim 72c external blades 75a are connected, eighteen of them in the example shown, located vertically and independent from one another and which form a sleeve 75 for retaining vials. The internal profile of each sleeve formed by the inner face of said external blades 75a forms in its lower part a retaining lug 75a$_1$, as can be seen in FIG. 16b. This lug is followed by an outwardly inclined bevel 75a$_2$. All of the bevels of the blades taken together form a funnel which guides the insertion of the vials and facilitates the expansion of the blades.

It can be seen in FIGS. 13 and 13c to 13g that the outer faces of the external blades 75a delimit, in their upper part, a figure in the shape of an inverted open truncated right cone (reference symbol F in FIG. 13e), followed in the lower part by a cylindrical figure (reference symbol G in FIG. 13f) or failing that by a figure in the shape of an inverted open truncated right cone, subject to the draft required for removal from the mold. The external blades 75a have, on their outer faces, stiffeners 75b which are inscribed in their upper part within a cylindrical figure (reference symbol H in FIG. 13i), followed in their lower part by a figure in the shape of an inverted open truncated right cone (reference symbol J in FIG. 13i), subject to the draft required for removal from the mold. This special shape permits natural removal of the injection-molded part from the mold.

FIGS. 16a and 16b illustrate the behavior of the external blades 75a which, being free in their lower part, move elastically outwards when a vial is inserted by being pushed upwards, pivoting about an axis situated in the connection zone of each blade 75a to the plate 72 so as subsequently to retain it by virtue of their natural spring effect assisted by the retaining effect of the lug 75a1. As shown in FIG. 16a, the external diameter P2 of the lower part of the sleeve at the end of its expansion phase must not be greater than the external diameter M2 of the plates, the principle of the displacement of the vial supports entailing that the plates remain in contact with each other.

As indicated above, the skirt 72e forms a stop preventing the external blades 75a from moving away beyond this diameter, which ensures that the deformation of the external blades will not exceed the elastic limit of the material from which they are manufactured.

According to a particularly advantageous alternative embodiment illustrated in FIG. 16a, the plate 72 of the support is equipped with means for interacting with the inner bowl of the spice grinders which are provided on the top of vials instead and in place of conventional stoppers. To this end, the underside of the plate 72 has a cavity delimited by a retaining ring 78. The ring 78 consists of oblique and divergent independent internal blades 78a having in their lower part an outward-facing bevel, said blades being located vertically between two spokes 72d and tangential to the external edge of the hub of the plate 72. The form of the lower part as an inverted truncated cone guides the insertion of the vials and facilitates the retraction of the internal blades. For its part, the form of the upper part as a truncated cone creates the spring effect which retains the vials by the pressure of the internal blades against the internal periphery of the rim of the bowl of the grinders. According to a particularly advantageous feature shown in FIG. 13a, it can be seen that the inner and outer faces of each of the external 75a and internal 78a blades comprising said sleeves 75 and 78 are flat at their join (reference symbols A and B) with the plate 72. The cavity which the underside of the plate has contains a second ring 72g which serves as a depth stop, with the same height but located beneath the hub. The two rings are centered relative to the axis of the plate 72.

Three embodiments of the orienting studs 73 will now be described with reference to FIGS. 11b to 11d and 12a to 12c.

According to a first embodiment illustrated in FIGS. 11b and 12a, each support has, on the upper face of its plate 72, a crescent-shaped molded orienting stud 73a which partially covers two contiguous spokes 72d and the part of the rim 72c which connects them. The crescent which forms the orienting stud is created from a circular traced figure (reference symbol T in FIG. 12a) within which it is inscribed. The center of this circle is positioned at the intersection of the median axis of two contiguous spokes (x) and the tangent (y) at the internal edge of the rim of the plate, as shown in FIG. 11b. The crescent 73a is equidistant relative to said contiguous spokes 72d, which it partially covers. As a result, a portion of said traced circle is situated outside the perimeter of the plate. In order to maintain the integrity of the circular shape of the plate, the body of the crescent is cut perpendicularly flush with the edge of said plate. The orienting stud 73a thus has a crescent-shaped contour which creates a tangential contact with the sides of the track 3 against which it is in sliding contact in the use position of the apparatus. This contributes to facilitating the sliding of the studs in the track 3.

In a second embodiment illustrated in FIGS. 11c and 12b, instead of being molded with the support 72, the orienting stud 73b is manufactured as a separate part which can be detached from the plate using its carrier, equipped with lugs 73c. The said carrier makes it possible to insert it and hold it equidistant between two contiguous spokes 72d of the plate. The crescent 73b which forms the orienting stud is created, as in the previous exemplary embodiment, from a circular traced figure T within which it is inscribed. The center of this circle is positioned at the intersection of the median axis (x) of two contiguous spokes and the tangent (y) at the internal edge of the rim of the plate. The crescent 73b is equidistant relative to said contiguous spokes 72d, which it partially covers. As a result, a portion of said traced circle is situated outside the perimeter of the plate. In order to maintain the integrity of the circular shape of said plate, the body of the crescent is cut perpendicularly flush with the edge of the plate.

Said stud can thus be molded from a non-friction material different from that of the plate and the associated sleeve.

According to a third embodiment illustrated in FIGS. 11d and 12c, the orienting stud 73d which can be detached from the plate using a carrier equipped with lugs 73e, as in the previous exemplary embodiment, consists of a wheel rotating freely about a spindle carried by the carrier. Said carrier makes it possible to insert it and hold it equidistant between two contiguous spokes 72d of the plate. In order to maintain the integrity of the circular shape of the plate, the axis of the rotary stud is positioned on the median axis (x) of the two contiguous spokes such that its outer perimeter does not protrude beyond the perpendicular of the outer perimeter of the plate.

It may therefore also be molded from a non-friction material different from that of the plate and the associated sleeve.

Although these three embodiments of the orienting stud have been described with reference to the embodiment of the support according to FIG. 2, they also apply to the embodiment of the support according to FIG. 3.

A description will now be given, with reference to FIGS. 14a, 14b, 15, 16a and 16b, of the preferred embodiment of the mounting of a drive roller 71 on a vial support 72. It makes it possible to produce the piece for guiding the supports along the track 3 from a different non-friction material from that from which the supports are produced, so as to promote a jerk-free sliding of said supports.

As shown in FIGS. 15, 16a and 16b, the hub of the plate 72 carries, on its outer face, a rotational spindle 72a which has a vertical slot $72a_2$ which is greater than or equal to twice the width of the lugs $72a_1$, allowing the necessary amplitude of movement for the snap-fastening of said lugs into the circular bowl 71b of the drive roller 71 when it is assembled by being pressed onto the plate 72.

As shown in FIGS. 14a, 15 and 16a, the piece for guiding the vial supports along the track 3 is formed by a hollow guide spindle 71a integrated into the drive roller 71. This hollow spindle receives the rotational spindle 72a connecting the plate 72 to the drive roller 71 to form the vial support.

In an advantageous arrangement, with a view to reducing the packaging, storage and shipping costs of the apparatuses, the inventors have designed a telescopic battery box which allows the bulk of the apparatus to be reduced by 75% in the transportation position (without the batteries) compared with a traditional battery box.

As illustrated in FIGS. 1, 5, 8, 9 and 10, the battery box 60 of the device is equipped with two lateral tabs 61, the ends of which each have a locking catch 61a. Said battery box fits into a housing shaft 36, an integral part of the peripheral tray 30. Said shaft has laterally, on either side, shoulders 36a which allow said catches 61a to be locked, when said box 60 is filled with batteries in the operating mode. The housing shaft 36 also has two lateral recesses 36b to allow the passage of the catches 61a while the box is retracted when the apparatus without its batteries 63 is inserted into a compact unwedged packaging.

As can be seen in FIGS. 1, 8, 9 and 10, the battery box is located in the space available underneath the apparatus. The batteries are connected electrically in series by a metal strip 62 located in the base of the housing shaft 36 which accommodates the retractable battery box and by two other metal strips 62 located in the base of said box, the whole being connected to the switch/reversing switch 51 by a two-core wire 52a connected to the positive 53 and negative 54 poles of said batteries.

In the above-described exemplary embodiments, the sleeve and its plate are circular. This shape is not limiting and the sleeve and/or the plate can have any other appropriate shape (oval, polygonal, etc) without going beyond the scope of the invention.

We claim:

1. A conveyor, comprising:
   a tray equipped with a closed-loop track along which vials are driven continuously in vial supports arranged freely in contact with one another so as to form a continuous stream along the track,
   each support having a horizontal plate to which are connected a plurality of vertical blades, forming a ring, which are capable of moving away elastically relative to the axis of rotation of the plate,
   wherein inner faces of the blades are configured to hold a vial by gripping a periphery of the vial,
   wherein the inner faces and outer faces of the blades are flat where the inner and outer faces join with the plate, and
   wherein the inner faces of the blades each have a retaining lug for the vials, said lug being followed by an outwardly inclined bevel,
   all of the bevels of the blades taken together forming a funnel which guides the insertion of the vials and facilitates an expansion of the blades.

2. The conveyor as claimed in claim 1, wherein the thickness of upper parts of the blades of the vial supports is reduced at the join of said blades to the plate.

3. The conveyor as claimed in claim 2, wherein the outer face of the blades of the vial supports has a stiffener.

4. The conveyor as claimed in claim 3, wherein upper parts of the stiffeners of the blades of the vial supports form a cylindrical figure, and lower parts of the stiffeners form an inverted open truncated right cone.

5. The conveyor as claimed in claim 1, wherein the outer face of the blades of the vial supports has a stiffener.

6. The conveyor as claimed in claim 5, wherein upper parts of the stiffeners of the blades of the vial supports form a cylindrical figure, and lower parts of the stiffeners form an inverted open truncated right cone.

7. The conveyor as claimed in claim 1, wherein the plate of the vial supports comprises an outer rim connected by spokes to a hub comprising a rotational spindle.

8. The conveyor as claimed in claim 1, wherein the plate of the vial supports has a stop ring which surrounds the vertical blades and limits the elastic movement of the blades towards the outside.

9. The conveyor as claimed in claim 1, wherein the underside of the plate of the vial supports also has a cavity delimited by an inner retaining ring.

10. The conveyor as claimed in claim 9, wherein the inner retaining ring of the vial supports consists of independent blades located vertically between two spokes and tangential to the external edge of the hub of the plate.

11. The conveyor as claimed in claim 10, wherein the blades of the inner retaining ring of the vial supports are oblique and divergent, and lower parts of the blades have an outward-facing bevel.

12. The conveyor as claimed in claim 1, wherein the underside of the plate of the vial supports is equipped with a depth stop ring for limiting how far the vials can be pushed in.

13. The conveyor as claimed in claim 1, wherein each support is equipped with an orienting stud of the vial supports which has a crescent-shaped contour formed from a traced circular figure.

14. The conveyor as claimed in claim 1, wherein each support is equipped with an orienting stud of the vial supports which is manufactured as a separate piece which can be detached from the plate using a carrier, equipped with lugs.

15. The conveyor as claimed in claim 1, wherein each support is equipped with an orienting stud of the supports which consists of a wheel rotating freely about a spindle.

16. The conveyor as claimed in claim 1, further comprising:
   a hollow guide spindle for guiding the vial supports along the track incorporated into a drive roller,
   wherein said hollow guide spindle receives a rotational spindle connecting the plate to the drive roller.

17. The conveyor as claimed in claim 1, further comprising:
   a telescopic battery box.

* * * * *

UNITED STATES PATENT AND TRADEMARK OFFICE
CERTIFICATE OF CORRECTION

PATENT NO.        : 8,651,265 B2                                                                  Page 1 of 1
APPLICATION NO.   : 13/141163
DATED             : February 18, 2014
INVENTOR(S)       : Vazeille et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 243 days.

Signed and Sealed this
Twenty-ninth Day of September, 2015

Michelle K. Lee
*Director of the United States Patent and Trademark Office*